Patented June 23, 1953

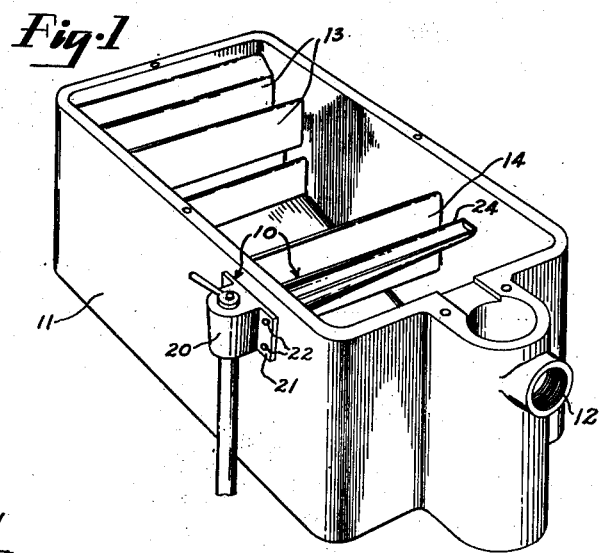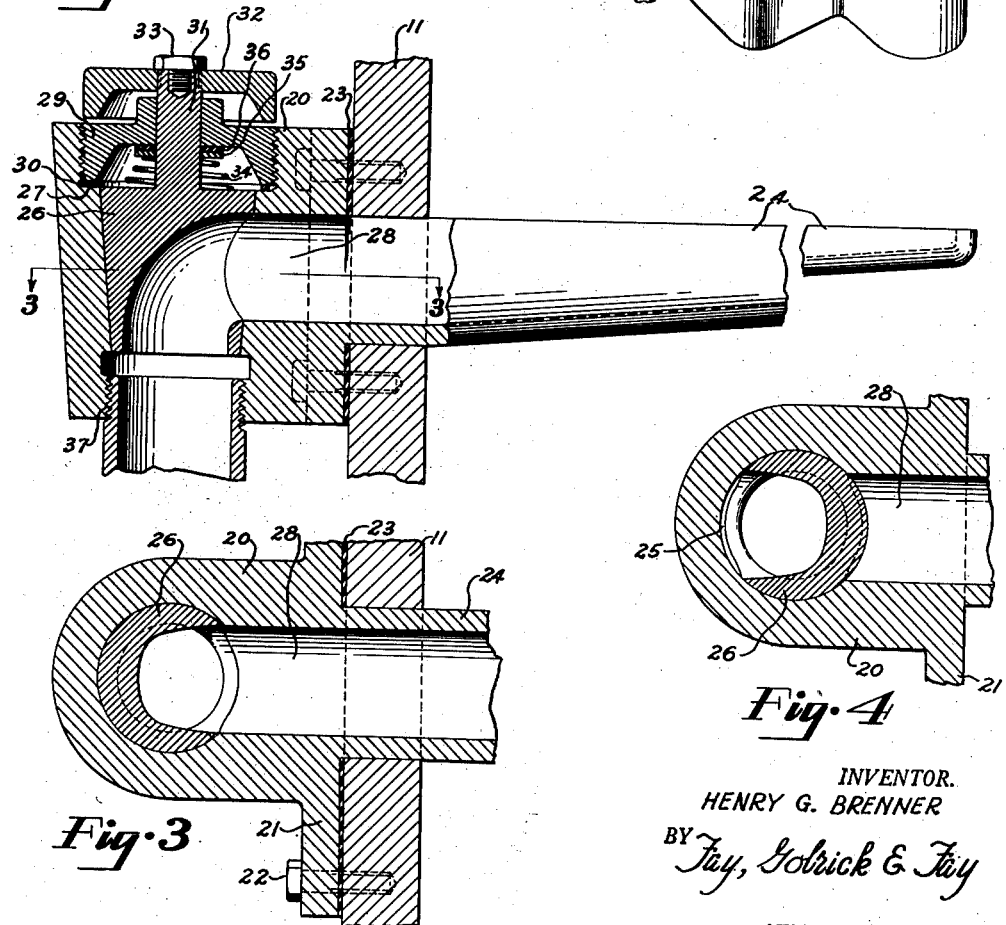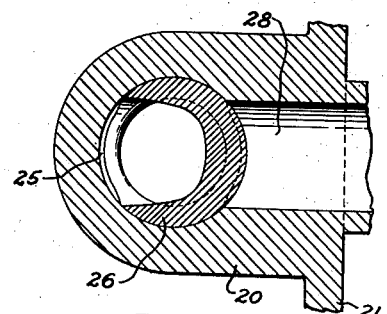

2,642,995

UNITED STATES PATENT OFFICE 2,642,995

OUTLET FOR GREASE SEPARATORS AND THE LIKE

Henry G. Brenner, Michigan City, Ind., assignor to Josam Manufacturing Company, Cleveland, Ohio, a corporation of Delaware Application March 30, 1950, Serial No. 152,873

2 Claims. (Cl. 210—51)

This invention relates to improvements in grease separators and the like. The object of this invention is the provision of an improved type of grease evacuating outlet for an apparatus by which one liquid is separated from another in which it is immiscible and from which it differs in specific gravity.

Another object is the provision of such an improved evacuator having a simple type of valve structure. Further objects and advantages of this invention will appear in the following specification and drawings of the invention.

In grease interceptors of the type described in my U. S. Patent No. 2,284,737, grease separates from waste water as a distinct layer overlaying a body of waste water in the course of operation of the apparatus. A grease outlet port by which the separated grease escapes is provided generally in a side wall of the interceptor, at some height above the level of the liquid remaining in the interceptor when waste water is not passing therethrough. During the time when waste is passing through the interceptor the liquid rises bringing the grease layer up to a height where a portion may escape through the outlet. Often this operating level may fluctuate or surge in a periodic fashion, in consequence whereof only that small portion of the grease adjacent the outlet escapes and that only during an upsurge. Furthermore, considerable waste water is often discharged through the grease outlet on these surges in the structures now commonly in use.

The grease discharge device of this invention improves the operation of interceptors in which used by providing, transverse to the compartment in which grease separates, a trough over the edges of which grease flows across substantially the entire width of the interceptor compartment. Thus on an upsurge of liquid, grease is gathered into the trough from practically the entire width of the compartment, and is retained there, although the surging liquid level drops, to drain off through the grease discharge opening at the end of the trough. Moreover, since the grease gathering capacity of the trough is greater than that of the simple discharge openings now in use, the level of the edge may be placed higher than the level of the usual discharge openings, with the result that the difficulty of water discharge on surging is ameliorated.

A valve is provided integrally with the grease trough to serve as a shut off to the grease storage receptacle into which the grease is usually discharged from the interceptor. The integral structure of trough and valve forms a structure simple to manufacture and assemble into the interceptor.

In the drawings:

Fig. 1 shows a grease separator incorporating this invention, the top of the separator being removed;

Fig. 2 is a detail of the grease skimming trough shown in partial vertical section through the axis thereof;

Fig. 3 is a horizontal section taken at 3—3 in Fig. 2 with the valve open;

Fig. 4 is a similar view to that of Fig. 3, but with the valve closed.

The improved grease outlet of this invention, indicated generally by the reference numeral 10 in Fig. 1, is shown there as applied to a grease interceptor apparatus of the type described in my U. S. Patent No. 2,284,737, comprising a rectangularly shaped basin 11, an outlet 12, current baffles 13, and a main partition baffle 14. The outlet 10 is placed between the partition 14 and the outlet end wall of the separator, in the chamber where the major portion of the grease accumulates, as described in the aforementioned patent.

This device comprises a base 20, having sidewise extending flanges 21 by which it is affixed to the outer wall of the basin 11 by bolts 22. Sealing gasket 23 is interposed between the base 20 and the wall. A trough shaped portion 24 extends from the base 20 through an aperture in the side wall to the interior of the separator. This trough is formed with horizontal edges and with a concave bottom which slopes downwardly from the end toward the base 20.

The base 20 also forms the body of a right angle plug-cock valve, and thus has a conical bore 25, a valve plug 26 in the bore, a threaded outlet 37 below the plug, and a horizontal port 28 leading from the trough 24 to the valve-plug. The top of bore 20 is counter-bored to form a shoulder 27, and is threaded to receive the valve stem bushing 29. A sealing gasket 30 is placed between the shoulder 27 and bottom of bushing 29. The valve stem 31 is provided with a handle 32 held in place by bolt 33. Splines or similar structures may be formed on the handle and stem to afford purchase therebetween. To keep the valve plug 26 seated, a helical compression spring 34 is disposed about the valve stem between the top of the plug and a metal washer 35 on the stem. A suitable sealing washer 36 is placed between the bushing 29 and washer 35. A cross-section of the base and valve structure taken at 3—3 in Fig. 2 appears in Fig. 3, for the valve in open position. A similar cross-section for the valve in closed position appears in Fig. 4.

Apart from the preferred form of the invention shown in the drawings, for particular uses the device may be modified, for example, by mounting a skimming trough provided with suitable base on the interior of the interceptor side wall, in register with an opening therethrough.

I claim:

1. In a grease interceptor having a compartment in which grease and like materials separate from a mixture of liquids passed therethrough to form an upper grease layer beneath which liquid flows through the interceptor and having interceptor discharge means for liquid flowing through the interceptor adapted to maintain a normal minimum liquid level in said compartment when liquid is not passing therethrough; a device for removing the grease from the uppermost layer comprising a base adapted for mounting to the outside of an upright wall of the interceptor and providing a shut-off plug valve body having a lateral valve inlet port and a downward valve outlet, a rotatable valve plug member in said body having a channel for putting said valve outlet and inlet in communication, a grease removing trough integral with and extending from said base through an aperture in said wall into the said compartment transversely to the path of liquid flow therethrough, said trough being located with its top edges above the said normal liquid level in the compartment and having a trough bottom sloping downwardly to said valve inlet port, whereby liquid from said upper layer is discharged into said trough and through said valve when the liquid level in said compartment is raised during passage of liquid through the interceptor.

2. A device as described in claim 1 wherein said valve plug includes a stem projecting beyond the said valve body, and wherein there is provided a centrally apertured disc disposed about the stem and threaded into said valve body and a compression spring about said stem interposed between said disc and said valve plug to hold the plug in position in the valve body.

HENRY G. BRENNER.

References Cited in the file of this patent

UNITED STATES PATENTS

| Number | Name | Date |
| --- | --- | --- |
| 911,314 | Maranville | Feb. 2, 1909 |
| 1,658,040 | Cohn | Feb. 7, 1928 |
| 2,284,737 | Hirshstein | June 2, 1942 |
| 2,355,875 | Lasseter | Aug. 15, 1944 |
| 2,479,386 | Matheis | Aug. 16, 1949 |

FOREIGN PATENTS

| Number | Country | Date |
| --- | --- | --- |
| 591,094 | France | Apr. 1, 1925 |
| 841,386 | France | May 17, 1939 |
| 327,968 | Germany | Oct. 19, 1920 |